United States Patent [19]

Takeyasu

[11] Patent Number: 4,948,227
[45] Date of Patent: Aug. 14, 1990

[54] APPARATUS FOR OPERATIVELY CONNECTING CAM RING AND ASSOCIATED MEMBER ACTUATED THEREBY

[75] Inventor: Hatuichi Takeyasu, Tokyo, Japan

[73] Assignee: Asahi Kogaku Kogyo K.K., Tokyo, Japan

[21] Appl. No.: 256,865

[22] Filed: Oct. 12, 1988

[30] Foreign Application Priority Data

Oct. 12, 1987 [JP] Japan .......................... 62-155799[U]
Oct. 12, 1987 [JP] Japan .......................... 62-155800[U]

[51] Int. Cl.⁵ .............................................. G02B 7/02
[52] U.S. Cl. ..................................... 350/255; 350/429
[58] Field of Search ............... 350/429, 430, 255, 423, 350/252

[56] References Cited

U.S. PATENT DOCUMENTS

| | | | |
|---|---|---|---|
| 4,162,822 | 7/1979 | Nonogaki | 350/429 |
| 4,380,378 | 4/1983 | Tamura | 350/429 |
| 4,386,829 | 6/1983 | Sumi | 350/429 |
| 4,824,207 | 4/1989 | Kamata et al. | 350/255 |
| 4,834,514 | 5/1989 | Atgut et al. | 350/429 |

*Primary Examiner*—Bruce Y. Arnold
*Assistant Examiner*—Loha Ben
*Attorney, Agent, or Firm*—Sandler, Greenblum & Bernstein

[57] ABSTRACT

An apparatus for operably connecting a rotatable cam ring having at least one cam groove therein, and a movable lens frame member having an association pin which is fitted int he cam groove of the rotatable cam ring, so that the movable lens frame member can be moved along the profile of the cam groove when the cam ring rotates. The cam groove opens at one end into one end base of the cam ring, so that associated pin, which is integrally connected in advance to the movable lens frame member, can be fitted into the associated cam groove from the open end of the cam groove.

19 Claims, 8 Drawing Sheets

APPARATUS FOR OPERATIVELY CONNECTING CAM RING AND ASSOCIATED MEMBER ACTUATED THEREBY

BACKGROUND OF THE INVENTION

Field of the Invention

The present invention relates to an apparatus for operatively connecting a rotatable cam ring having a cam groove and a member, such as a movable lens frame which is moved along a profile of the cam groove in association with the rotation of the cam ring, in a lens barrel.

Description of Related Art

FIGS. 10 and 11 show a known arrangement of a cam ring and a movable lens frame. In FIGS. 10 and 11, the cam ring 14 has zooming cam grooves 20 and 21 in which association pins (rollers) 17 and 19 of the movable lens frames 16 and 18, respectively, are displaceable in the optical axis direction of a zoom lens. When the cam ring 14 rotates, the movable lens frames 16 and 18 move in the optical axis direction in accordance with the profiles of the zooming cam grooves 20 and 21, so that positions of lenses supported by the associated lens frames 16 and 18 are changed to vary the distance between the lenses to adjust magnification.

The engagement of the association pins (rollers) 17 and 19 into the corresponding cam grooves 20 and 21 is effected as follows.

In FIG. 10, the movable lens frames 16, 18 which are slidably fitted onto a guide rod 12 extending in parallel with the optical axis are fitted in the cam ring 14, so that the cam grooves 20 and 21 are registered with corresponding threaded holes 16a and 18a of lens frames 16 and 18. After that, the screws 17b and 19b, which are inserted in the corresponding rollers 17a and 19a, are screwed into the associated threaded holes 16a and 18a through the cam grooves 20 and 21.

However, the engagement is a troublesome operation which needs a highly skilled operator, and makes automatic assembling thereof difficult. In the course of manual assembly even by a skilled person, screws 17b and 19b tend to fall into the cam ring 14.

Furthermore, the cam grooves 20 and 21 which are in the form of through holes decrease the strength of the cam ring 14. The decrease in strength is more serious when the cam grooves 20 and 21 are long, and when the provision of more than two cam grooves are necessitated, resulting in the need for an additional reinforcing member.

SUMMARY OF THE INVENTION

The primary object of the present invention is, therefore, to provide an apparatus for easily engaging the association pins into the corresponding cam grooves of cam ring.

Another object of the present invention is to provide a non-screw type of association pin of a movable lens frame in a lens barrel.

Still another object of the present invention is to provide a cam ring construction which can increase the strength of the cam ring.

The inventors of the present invention have conceived that the drawbacks of the prior art, as mentioned above, are caused by the closed cam grooves.

To achieve the objects mentioned above, in a lens barrel having a rotatable cam ring having at least one cam groove and a movable member (movable lens frame) which has an association pin which is engaged in the corresponding cam groove and which is moved along the profile of the cam groove in accordance with the rotation of the cam ring, according to one aspect of the present invention, the cam groove opens at one end into one end face of the cam ring, so that the association pin which is secured to the movable member can be fitted in the associated cam groove from the open end thereof.

If the movable member (movable lens frame) is made of synthetic resin, the association pin can be made integral therewith at one time. Namely, the association pin can be formed by a radial projection which is provided on the movable member made of synthetic resin.

With the arrangement mentioned above, the association pins which have been later secured to the movable lens frame by the set screws 19a, 19b (FIG. 10) in the prior art can be made integrally with the lens frame, in advance, because of the presence of the open ends of the cam grooves. Namely, the association pins can be inserted into the cam grooves through the open ends thereof. The association pins and the lens frame can be molded together at one time, as mentioned above. Alternatively, it is also possible to provide shafts or projections on the movable lens frame integral therewith, so that separate rollers or the like can be secured later to the shafts or the projections, for example, by press fitting.

It has been considered that if the cam grooves have open ends, additional reinforcing member(s) is(are) needed to compensate for the strength of the cam ring which is decreased due to the open end of the cam groove. Accordingly, the improvement of the present invention is also directed to the provision of a cam ring which has a cam groove with an open end and which has the necessary mechanical strength without such an additional reinforcing member. To realize this, according to another aspect of the present invention, the cam groove is formed as an inside cam groove with a closed top (upper end).

BRIEF DESCRIPTION OF DRAWINGS

The invention will be described below in detail with reference to the accompanying drawings, in which:

FIG. 10 is a sectional view taken along line B—B in FIG. 11, showing a known engaging arrangement of a cam ring and an associated lens frame; and.

DETAILED DESCRIPTION OF EMBODIMENTS

Figure 1:
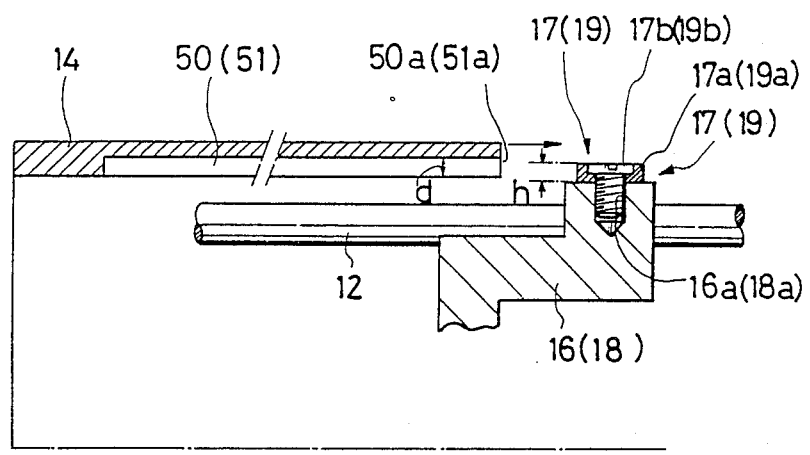
FIGS. 1 to 3 are sectional views taken along the line A—A in FIG. 6, showing different embodiments of an apparatus for operatively connecting a cam ring and a movable member in association therewith, in a lens barrel.

First, the reference is made to FIGS. 4 to 9, which generally show a lens barrel which has an apparatus for operatively connecting a cam ring and a movable lens frame, by way of example.

The lens barrel block 1 is supported, together with light emitter 3 and light receiver 4 of an object distance measuring deveice, (AF device) and a zoom motor 5 for zooming operation, by a base plate 6 on the camera body side.

Namely, the base plate 6 has a lens barrel supporting plate portion 6a perpendicular to the optical axis, and a horizontal supporting plate portion 6b which is bent at right angles at the upper end of the lens barrel supporting plate portion 6a. The lens barrel block 1 is supported by the lens barrel supporting plate portion 6a. To the horizontal supporting plate portion 6b is secured the zooming motor 5 above the center of the lens barrel block 1, so that light emitter 3 and the light receiver 4 are located on opposite sides of the zoom motor 5. A finder block (not shown) is secured to the front right portion of the horizontal supporting plate portion 6b. A rear securing plate 11 of lens barrel block 1 is secured to the lens barrel supporting plate portion 6a of base plate 6 by a set screw 10. The rear securing plate 11 has four guide rods 12 secured thereto which extend in parallel with the optical axis and which are located on the same circle on rear securing plate 11. A front securing plate 13 is secured to the front ends of the guide rods 12. The above-mentioned elements are main stationary elements of lens barrel block 1.

Figure 5:
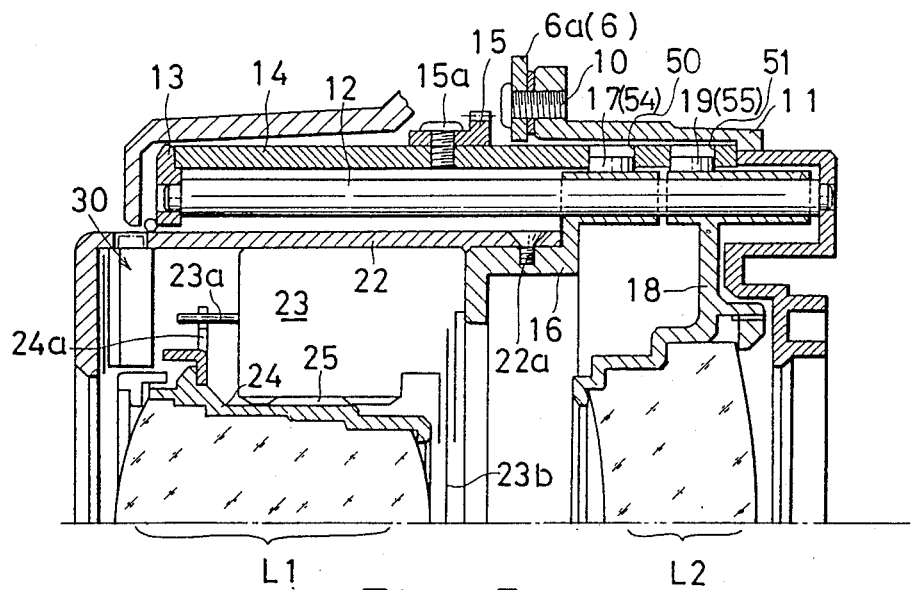
FIG. 5 is the longitudinal sectional view of a lens barrel shown in FIG. 4.

Between the rear and front securing plates 11 and 13, a cam ring (lens driving ring) 14 is rotatably supported which is provided with, on, its outer periphery, a gear 15 secured thereto by a set screw 15a (FIG. 5). The gear 15 meshes directly or through a gear train with pinion 7. Gear 15 can be a sector gear which covers the range of cam rotational movement of cam ring 14. has zooming cam grooves 50 and 51 for the front group and the rear group of lenses.

Figure 6:
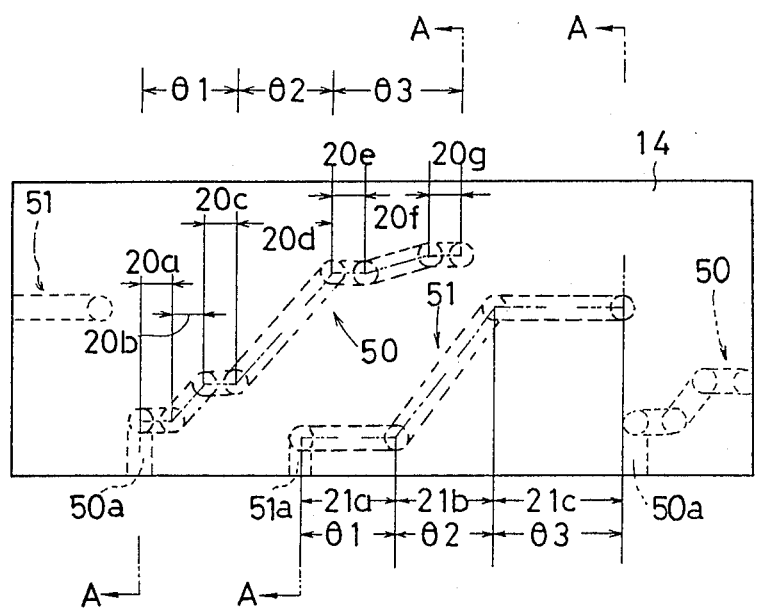
FIG. 6 is a developed view of a cam ring according to one aspect of the present invention.
Figure 7:
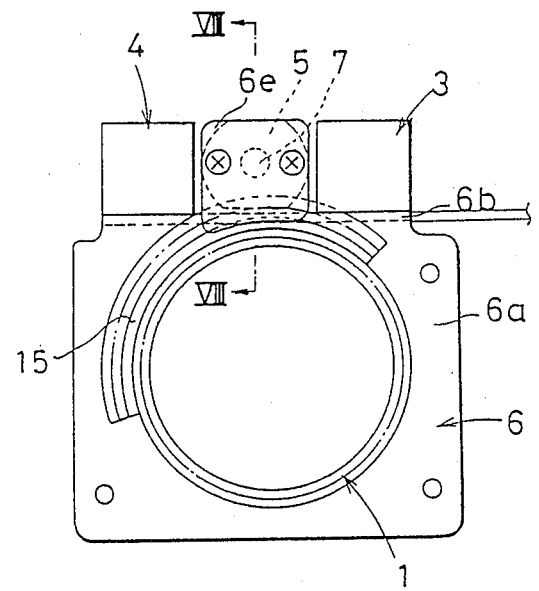
FIG. 7 is a front elevational view of a cam ring portion.
Figure 8:
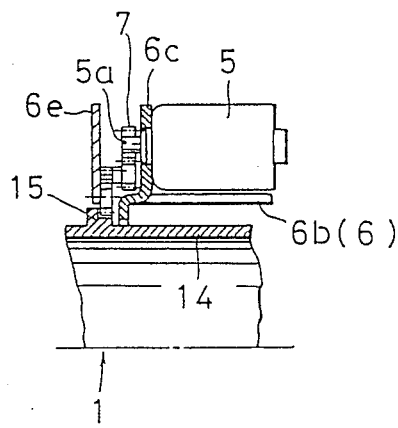
FIG. 8 is a sectional view taken along line VIII—VIII in FIG. 7.
Figure 9:
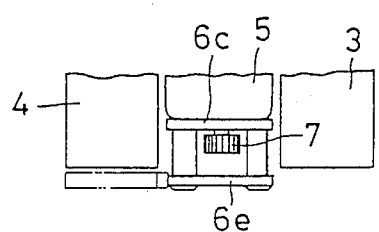
FIG. 9 is a plan view of FIG. 7.
Figure 10:
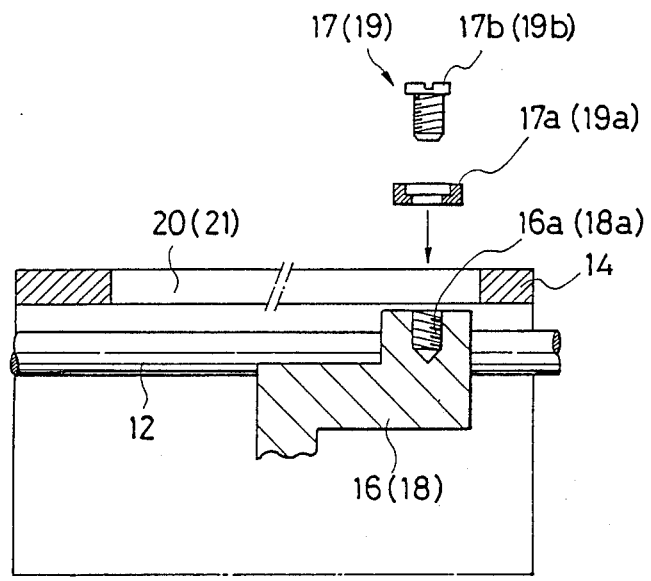

FIG. 6 is a developed view of a pair of zooming cam grooves 50 and 51, in which the zooming cam groove 51 for the rear group of lenses has a wide-angle extremity fixing 20 section 21a, a variable power section 21b, and a telephoto extremity fixing section 21c. On the other hand, the zooming cam groove 50 for the front group of lenses has an opening and closing section 20a for a barrier block 30, a lens accommodating section 20b, a wide-angle extremity fixing section 20c, a variable power section 20d, a telephoto extremity fixing section 20e, a macro-feeding section 20f, and a macro-extremity fixing section 20g. The rotational angles of these sections are such that the total angle displacement θ 1 of the opening and closing section 20a, the lens accommodating section 20b and the wide-angle extremity fixing section 20c, of zooming cam groove 50, is identical to the angular displacement θ 1 of the wide-angle extremity fixing section 21a of the zooming cam groove 51, the angular displacement θ 2 of the variable power section 20d is equal to that of the variable power section 21b, and the total angular displacement θ 3 of the telephoto-extremity fixing section 20e, the macro-feeding section 20f and the macro-extremity fixing section 20g, is identical to the angular displacement θ 3 of the telephoto-extremity fixing section 21c.

Figure 11:
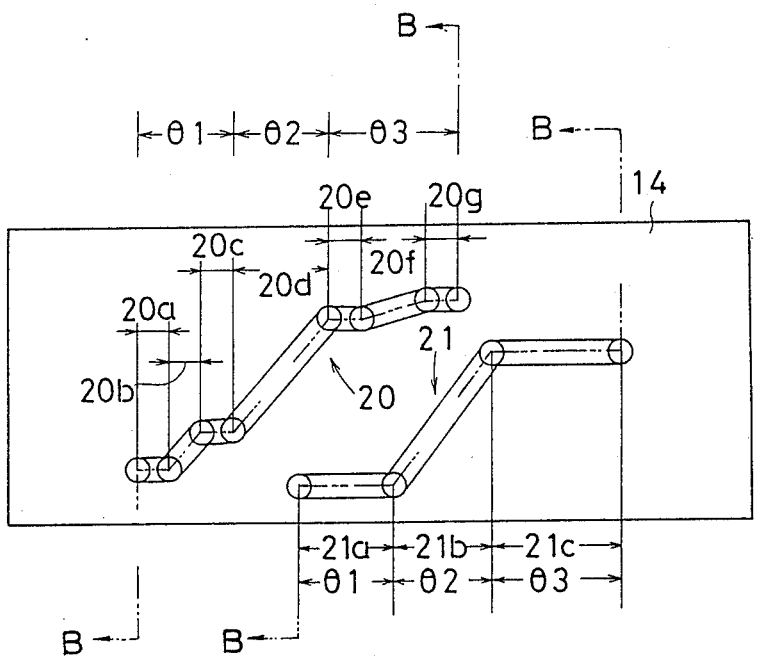
FIG. 11 is a developed view of a known cam ring.

The profiles of the cam grooves 50 and 51 are identical to those of the cam grooves 20 and 21 shown in FIG. 11. According to the present invention, the cam grooves 50 and 51 are inside grooves, in the form of inwardly opening recesses. Namely, the cam grooves 50 and 51 have closed outer ends (i.e., upper ends in FIG. 1) or closed tops. Furthermore, according to the present invention, the cam grooves 50 and 51 have open ends 50a and 51a which open into the rear end face of the cam ring 14. The open ends 50a and 51a are defined by portions extending in parallel with the optical axis from the regular cam profiles of cam grooves 50 and 51.

The depth d of cam grooves 50 and 51 is slightly larger than the height h of association pins 17 and 19, as shown in FIG. 1. It should be appreciated that the inside cam grooves 50 and 51, even when having open ends 50a and 51a, do not decrease the strength of the cam ring 14, and, accordingly, no reinforcing member is necessary.

Preferably, two pairs of cam grooves 50 and 51, each pair having one groove 50 and one groove 51 are provided, for example, so as to be diametrically opposed to each other, on the cam ring 14. The movable lens frames 16 and 18 have association pins 17 and 19 secured thereto, which are fitted in the corresponding cam grooves 50 and 51 when they are attached to cam ring 14. Namely, first, rollers 17a and 19a are secured to lens frames 16 and 18 by means of set screws 17b and 19b, which are screw-engaged into the corresponding threaded holes 16a and 18a. After that, the cam ring 14 is moved in the optical axis direction to engage rollers 17a and 19a into cam grooves 50 and 51. Since the positions of the threaded holes 16a and 18a are restricted by guide rods 12, the association pins 17 and 19 can be easily fitted in the corresponding cam grooves 50 and 51 by bringing the threaded holes into registration with the open ends 50a and 51a of cam grooves 50 and 51. The front securing plate 13 is then secured to the front end of guide rods 12, so that the cam ring 14 can be rotatably supported between front securing plate 13 and rear securing plate 11.

Figure 2:
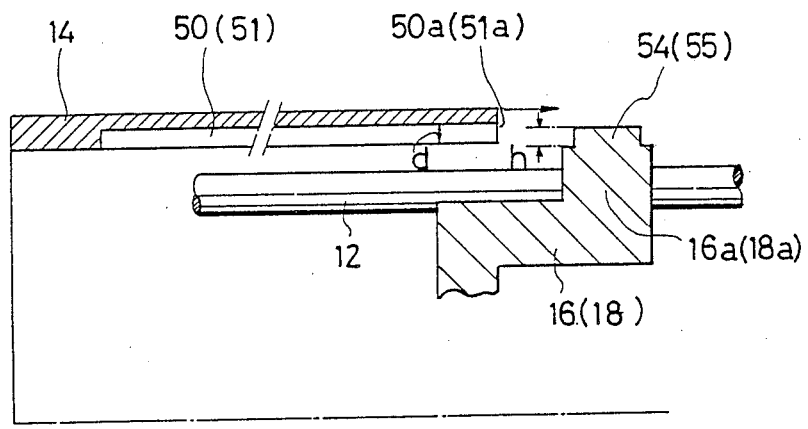
Figure 3:
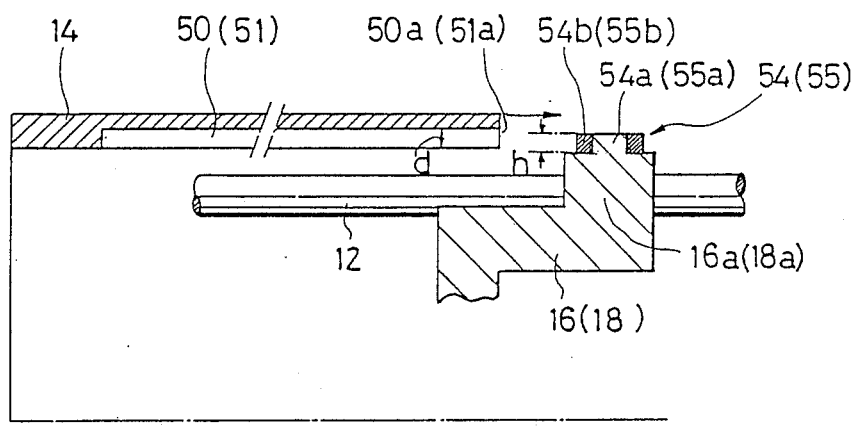
Figure 4:
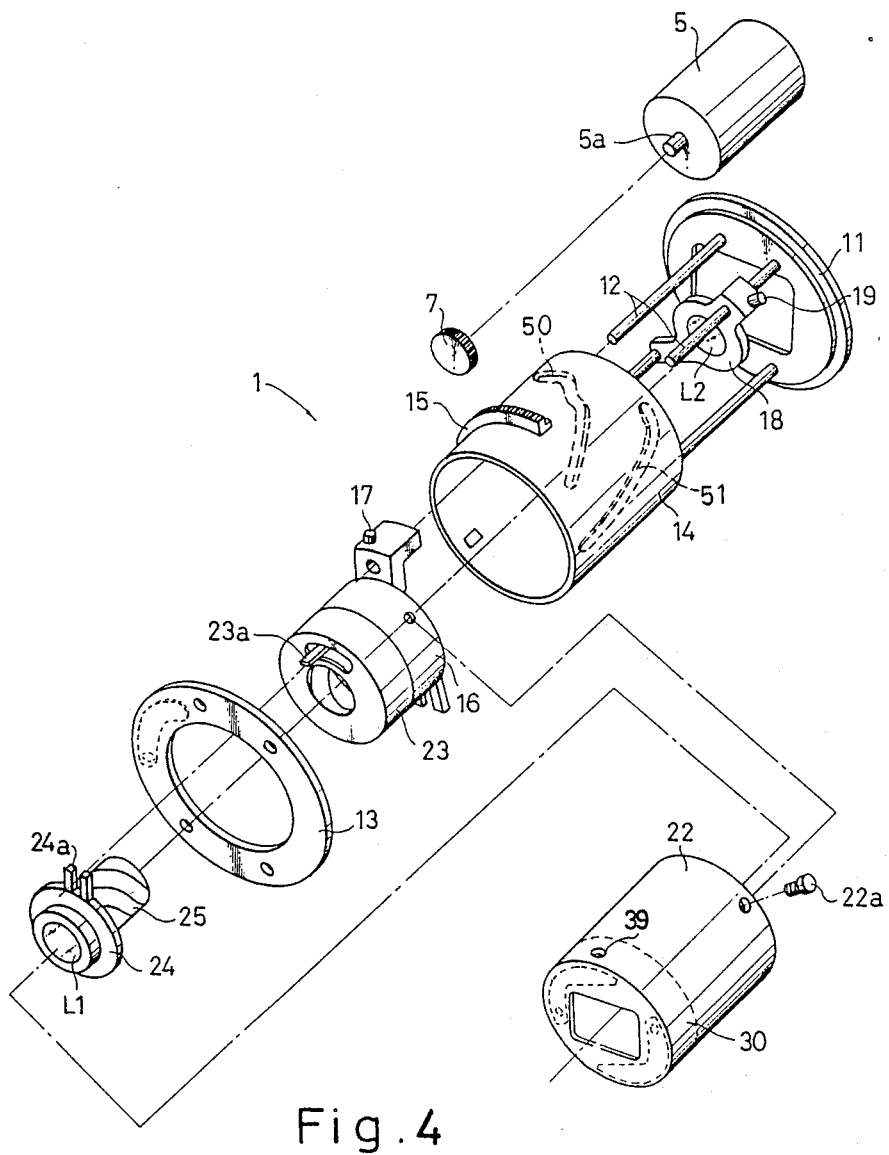
FIG. 4 is an exploded perspective view of a lens barrel to which the present invention can be applied, by way of example.

FIGS. 2 and 3 show different embodiments of the association pins provided on the movable lens frames 16 and 18.

In the embodiment illustrated in FIG. 2, the association pins 54, 55, which are each in the form of a radially projecting cylindrical body, are molded together with the movable lens frames 16 and 18 made of synthetic resin.

In the embodiment illustrated in FIG. 3, the radially projecting shaft portions 54a and 55a are made integral with the movable synthetic resin lens frames 16 and 18. The shaft portions 54a and 55a are press-fitted into the rollers 54b and 55b, which are made of pieces separate from the lens frames 16 and 18, so as to form the association pins 54, 55. The depth d of the cam grooves 50 and 51 is slightly larger than the height h of the association pins 54 and 55, similarly to the above-mentioned embodiment shown in FIG. 1. Other 20 construction of the embodiment shown in FIG. 3 is the same as that of FIG. 1. The elements corresponding to those shown in FIG. 1 are designated with corresponding reference numerals.

In the embodiment shown in FIG. 3, although the number of steps of formation of the association pins 54 and 55 is increased in comparison with the embodiment shown in FIG. 2, it is possible to make only the separate rollers 54b and 55b from a material having a low frictional property in order to provide better operational characteristics.

To the front frame (movable lens frame) 16 is secured a front lens holding frame (photographing lens holding frame) 22 by means of set screws 22a. The shutter block 23 is secured to the movable lens frame 16. The front lens frame 24 which supports the front group of lenses L1 is screw-engaged by the shutter block 23 through a helicoid 25 and has an arm 24a which comes into engagement with a lens feeding lever 23a of shutter block 23. Consequently, when the lens feeding lever 23a rotates in the circumferential direction to rotate the front lens frame 24 in the same direction, the front lens frame 24 moves in the optical axis direction with the help of the helicoid 25. The rear group of lenses L2 is directly secured to a rear frame (movable lens frame) 18. The shutter block 23, which is per se known, rotates the lens feeding lever 23a by an angular displacement corresponding to an object distance which is measured by the object distance measuring device by a pulse motor incorporated therein. Then, the shutter opens for a predetermined period of time. After that, the shutter is closed and the lens feeding lever 23a is returned to its initial position.

In the lens barrel mentioned above, when the cam ring 14 is rotated by the zoom motor 5, the front lens holding frame 22 (front frame 16) and the rear frame 18 are moved in the optical axis direction in accordance with the profiles of the zooming cam grooves 50 and 51 to effect the zooming operation. The rotation of the cam groove 50 in the lens accommodating section 20b causes a further linear movement of the front lens holding frame 22 beyond an extremity of a section in which photographing is possible, in order to decrease the optical length in an inoperative position.

The movable members which are fitted in the cam grooves 50 and 51 are not limited to the movable lens frames as mentioned above and can be other members, such as hood members or the like, which move in accordance with the profiles of the cam grooves.

I claim:

1. An apparatus for a lens barrel having a rotatable cam ring with at least one cam groove and at least one movable member which has an association pin engaged in said at least one cam groove, said association pin and said at least one cam groove comprising means for moving said at least one movable member along said at least one cam groove in accordance with the rotation of said cam ring, said cam ring having first and second axially spaced end faces, said at least one cam groove comprising first and second ends and a non-linear groove extending between said ends, one of said ends of said at least one cam groove comprising means extending into one of said end faces of said cam ring, said at least one movable member together with said association pin are adapted to be fitted into said non-linear cam groove from said one of said ends of said at least one cam groove extending into said one of said end faces of said cam ring.

2. An apparatus for a lens barrel according to claim 1, wherein said association pin comprises a roller and threaded shaft portion which secures the roller to the movable member.

3. An apparatus for a lens barrel according to claim 1, wherein said movable member is made from synthetic resin.

4. An apparatus for a lens barrel according to claim 3, wherein said association pin comprises a cylindrical projection integral with the movable member.

5. An apparatus for a lens barrel according to claim 1, wherein said association pin comprises a shaft portion integral with the movable member, and a roller in which the shaft portion is press fitted.

6. An apparatus for a lens barrel according to claim 5, wherein said shaft portion projects from the movable member in the radial direction thereof.

7. An apparatus for a lens barrel according to claim 1, wherein said movable member is a movable lens frame which supports at least one lens and which moves in the optical axis direction of the lens barrel.

8. An apparatus for a lens barrel according to claim 1, wherein said cam ring has two identical pairs of cam grooves.

9. An apparatus for a lens barrel according to claim 8, wherein said two pairs of cam grooves are diametrically opposed to each other on the cam ring.

10. An apparatus for a lens barrel according to claim 1, wherein said at least one cam groove is an interior cam groove which has a closed top and which opens into the interior of the lens barrel.

11. An apparatus for a lens barrel according to claim 10, wherein said interior cam groove has a depth slightly larger than the height of the association pin projecting from the movable member.

12. An apparatus for a lens barrel according to claim 10, wherein said association pin comprises a roller and threaded shaft portion which secures the roller to the movable member.

13. An apparatus for a lens barrel according to claim 10, wherein said movable member is made from synthetic resin.

14. An apparatus for a lens barrel according to claim 13, wherein said association pin comprises a cylindrical projection integral with the movable member.

15. An apparatus for a lens barrel according to claim 10, wherein said association pin comprises a shaft portion integral with the movable member and a roller in which the shaft portion is press fitted.

16. An apparatus for a lens barrel according to claim 15, wherein said shaft portion projects from the movable member in the radial direction of the movable member.

17. An apparatus for a lens barrel according to claim 10, wherein said movable member is a movable lens frame which supports at least one lens and which moves in the optical axis direction of the lens barrel.

18. An apparatus for a lens barrel according to claim 10, wherein said cam ring has two identical pairs of interior cam grooves.

19. An apparatus for a lens barrel according to claim 18, wherein said two pairs of interior cam grooves are diametrically opposed to each other on the cam ring.

* * * * *

UNITED STATES PATENT AND TRADEMARK OFFICE
CERTIFICATE OF CORRECTION

PATENT NO. : 4,948,227
DATED : August 14, 1990
INVENTOR(S) : Hatuichi Takeyasu It is certified that error appears in the above-identified patent and that said Letters Patent is hereby corrected as shown below:

At column 1, line 35, before "screws" delete "the".
At column 2, line 67, after "and" (second occurrence) delete ".".
At column 3, line 3, before "reference" delete "the".
At column 3, line 9, after "device" insert --,--.
At column 3, line 35, after "on" delete ",".
At column 3, line 39, delete "cam" (1st occurrence).
At column 3, line 39, after "cam ring 14." insert --cam 14--.
At column 4, line 57, after "other" delete "20".
At column 3, line 9, "deveice" (1st occurrence) should read --device--.

Signed and Sealed this

Fourth Day of May, 1993

Attest:

MICHAEL K. KIRK

*Attesting Officer*      Acting Commissioner of Patents and Trademarks